United States Patent [19]

Hagyuda et al.

[11] Patent Number: 4,519,683
[45] Date of Patent: May 28, 1985

[54] ELECTRONIC FLASH APPARATUS

[75] Inventors: Nobuyoshi Hagyuda; Hiroshi Hasegawa, both of Tokyo; Yoshikazu Iida, Chigasaki; Osamu Maida, Tokyo, all of Japan

[73] Assignee: Nippon Kogaku K.K., Tokyo, Japan

[21] Appl. No.: 643,695

[22] Filed: Aug. 24, 1984

Related U.S. Application Data

[63] Continuation of Ser. No. 417,202, Sep. 13, 1982, abandoned.

[30] Foreign Application Priority Data

Sep. 16, 1981 [JP] Japan ............... 56-144749

[51] Int. Cl.³ .................. G03B 15/02; G03B 7/16
[52] U.S. Cl. .................. 354/127.11; 354/416; 354/418
[58] Field of Search .................. 354/413–420, 354/145.1, 127.1, 127.12, 127.11, 173.1, 173.11

[56] References Cited

U.S. PATENT DOCUMENTS

| 3,971,049 | 7/1976 | Ohmori et al. | 354/127.1 |
|---|---|---|---|
| 3,978,496 | 8/1976 | Matsumoto | 354/419 |
| 4,086,582 | 4/1978 | Kiyohara et al. | 354/417 |
| 4,096,492 | 6/1978 | Land et al. | 354/418 |
| 4,112,442 | 9/1978 | Maeda et al. | 354/418 |
| 4,354,750 | 10/1982 | Hasegawa et al. | 354/416 |
| 4,393,335 | 7/1983 | Hirata et al. | 354/145.1 X |

Primary Examiner—L. T. Hix
Assistant Examiner—Douglas S. Lee
Attorney, Agent, or Firm—Fitzpatrick, Cella, Harper & Scinto

[57] ABSTRACT

In an electronic flash apparatus, electric power is alternately supplied by a same power source to the voltage elevating circuit for charging the main capacitor for flash emission and to other circuits provided in the flash unit or in the camera, such as a light emission control circuit for controlling the quantity of emitted light, an indicator circuit for indicating the completion of the charging of the main capacitor, an indicator circuit for indicating whether the light emission control is in operation, an alarm circuit for indicating an inadequate setting of the flash unit etc.

4 Claims, 3 Drawing Figures 4,519,683

ELECTRONIC FLASH APPARATUS

This is a continuation of application Ser. No. 417,202, filed Sept. 13, 1982, now abandoned.

BACKGROUND OF THE INVENTION

1. Field of the Invention

The present invention relates to an electronic flash apparatus, and more particularly to an electronic flash apparatus in which electric power is supplied by the same power source to the voltage elevating circuit for charging the main capacitor for flash emission and to other circuits provided in the flash unit or in the camera, such as a light emission control circuit for controlling the quantity of emitted light, an indicator circuit for indicating the completion of the charging of the main capacitor, an indicator circuit for indicating whether the light emission control is in operation, an alarm circuit for indicating an inadequate setting of the flash unit etc.

The above-mentioned power source shall include a battery, a power source producing a D.C. voltage from an A.C. power supply, and a power source converting an A.C. power supply into a determined voltage by a transformer.

2. Description of the Prior Art

In a conventional electronic flash apparatus, when the voltage elevating circuit is activated immediately after the flash emission to start the charging of the main condenser, the power source voltage is temporarily reduced and noises are generated due to oscillation in the voltage elevating circuit. Such noise-bearing reduced power source voltage is often insufficient for driving the light emission control circuit or other related indicator circuits, or induces unstable function therein.

In order to prevent such drawbacks, it is already proposed to completely interrupt the charging of the main capacitor during a determined period, for example from the flash emission to the operation of indicating whether the flash emission control is in proper operation. Such method is however associated with a drawback of inevitably prolonged recycle time from the flash emission to the completion of charging of the main capacitor.

SUMMARY OF THE INVENTION

The object of the present invention is to provide an electronic flash apparatus capable of alternately repeating the power supply to the voltage elevating circuit and to other circuits.

DETAILED DESCRIPTION OF THE PREFERRED EMBODIMENTS

Figure 1:
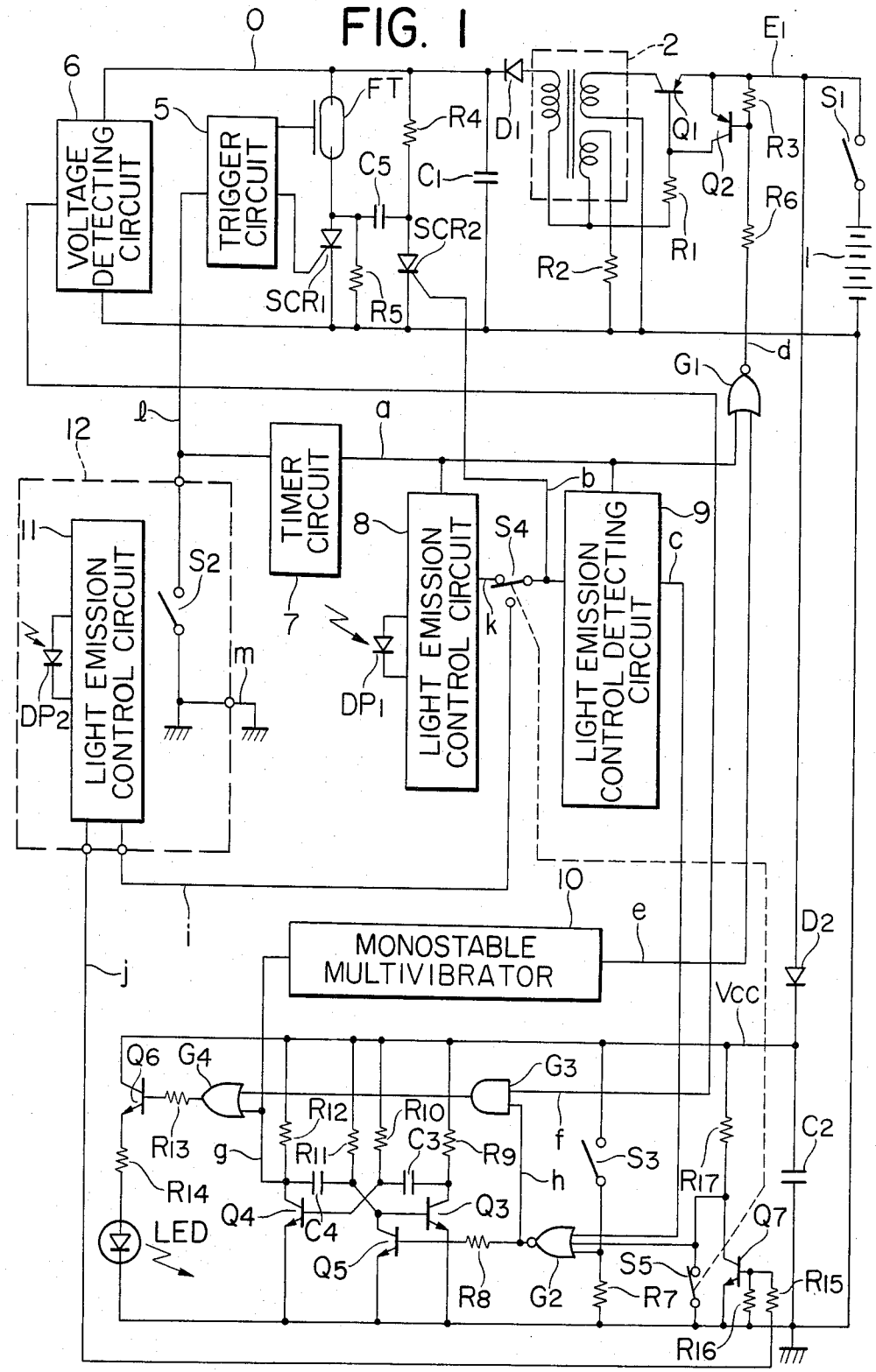
FIG. 1 is a circuit diagram showing an embodiment of the present invention.

FIG. 1 shows an embodiment of the electronic flash apparatus of the present invention, wherein provided are a power source 1; a power switch S1; a voltage elevating transistor Q1; a voltage elevating transformer 2; a main capacitor C1 for accumulating the energy for light emission; a flash tube FT; a main thyristor SCR1 for starting the light emission from the flash tube FT; a trigger circuit 5 for supplying a trigger pulse to a trigger electrode of the flash tube FT and to a gate of the thyristor SCR1 to initiate the light emission; a commutating capacitor C5; resistors R4, R5 for charging said capacitor C5; a secondary thyristor SCR2 for terminating the light emission from the flash tube FT; a detecting circuit 6 for detecting the charged voltage of the capacitor C1; a photodetector DP1 provided in the electronic flash apparatus; a timer circuit 7; a light emission control circuit 8; a light emission control detecting circuit 9; a monostable multivibrator 10; and an indicator element LED for indicating the completion of charging of the flash apparatus and whether the light emission control is in proper function. The power source 1 supplies a voltage E1, which is smoothed to a voltage Vcc with a diode D2 and a capacitor C2. Also a circuit for driving the indicator element LED is composed of a transistor Q6 and resistors R13, R14. A transistor Q2 is provided to control the function of the transistor Q1. Also provided is a NOR gate G1 of which input terminals are respectively connected to the output terminals of the timer circuit 7 and the monostable multivibrator 10, and of which output terminal is connected through a resistor R6 to the base of said transistor Q2. A camera body 12, indicated by a broken-lined block, is connected to the electronic flash apparatus of the present invention and transmits a synchronizing signal 1, a reference voltage m, a light emission stop signal i and a camera identification signal j to said apparatus. A switch S2 represents a flash contact provided in the camera. A photodetector DP2 converts the flash light emission reflected by an object and received through a lens diaphragm into an electric signal. A circuit 11, comprising a light emission control circuit, generates a light emission stop signal i when the light reflected by the object and received by the photodetector DP2 reaches a determined value. Also said circuit 11 releases a camera identification signal j for enabling the electronic flash apparatus to identify if the connected camera has a light emission control circuit and has a function of releasing the light emission stop signal (hereinafter called TTL light emission control function), since a camera not provided with said TTL light emission control function is unable to release said signal j. Switches S3, S5, a NOR gate G2, resistors R7, R15, R16, R17, and a transistor Q7 constitute an alarm circuit. Also transistors Q3, Q4, capacitors C3, C4 and resistors R9, R10, R11, R12 constitute an astable multivibrator, and a transistor Q5 is connected thereto to control the function of said astable multivibrator. An AND gate G3 is connected at the input terminals thereof to the output terminals of the charged voltage detecting circuit 6 and the NOR gate G2, and an OR gate G4 is connected at the output terminal thereof through a resistor R13 to the base of the transistor Q6 receiving the output signals from the AND gate G3 and the aforementioned astable multivibrator, in order to control the function of said transistor Q6. A switch S4 is linked with a switch S5 and is connected to a line k in case the light emission control of the electronic flash apparatus is effected by the light emission control circuit 8 of said apparatus itself, and in such state the switch S5 remains closed. Also in case the light emission control is effected by the TTL light emission control function of the camera, the switch S4 is connected to the line i and the switch S5 remains open. Said switches S4, S5 are positioned on the electronic flash apparatus and are manipulated at the discretion of the operator. A switch S3 is for example a detecting switch provided in a mounting leg of the flash apparatus and closed when the flash apparatus is incompletely mounted on the camera, thereby giving an alarm to the operator. Otherwise said switch is closed when the light emitting unit of the flash apparatus is in a light bouncing position, thereby giving an alarm to inform the operator that the effective guide number of the flash apparatus is reduced.

Now there will be explained the function of the electronic flash apparatus of the present invention shown in FIG. 1.

At first explained is a state of using the light emission control circuit 8, in which the switch S4 is connected to the line k and the switch S5 is closed.

In response to the closing of the power switch S1, the voltage elevating circuit composed of the transistor Q1, resistors R1, R2 and voltage elevating transformer 2 starts oscillation, with noise generation, to charge the main capacitor C1 through the doide D1, and other circuits are simultaneously activated. In this state the transistor Q2 remains turned off.

When the shutter of the camera is subsequently released, the flash contact switch S2 is closed to shift the line l to the low-level state, whereby the trigger circuit 5 applies a high voltage to the trigger electrode of the flash tube FT and turns on the thyristor SCR1. Thus the flash tube FT discharges the energy charged in the main capacitor C1 thereby causing the light emission. Also the timer circuit 7 releases a high-level output signal a for a determined period T1 after the flash contact switch S2 is closed. Said period T1 is selected to be longer than the light emission period of the flash tube FT. In response to said high-level signal a the light emission control circuit 8 starts the light emission control operation. The light from the flash tube FT reflected by the object is received by the photodetector PD1 and integrated. When said integration reaches a determined value, said circuit releases a high-level light emission stop signal to the line k connected to the line b. In response to said stop signal the thyristor SCR2 is turned on to turn off the thyristor SCR1, whereby the light emission from the flash tube FT is terminated. The light emission control detecting circuit 9 identifies the start of light emission by said high-level signal a and the normal light emission control function by the shift of the line b to the high-level state within the period T1, and shifts the line c to the low-level state. In case the line b is not shifted to the high-level state during said period T1, the circuit 9 releases a light emission control alarm signal by maintaining the line c at the high-level state for a determined period T2. The light emission control function of the control circuit 8 and the light emission control detecting function of the detecting circuit 9 are completed within the period T1 during which the output signal a of the timer circuit 7 remains at the high-level state, and the NOR gate G1, receiving said output signal a, releases a low-level output signal d during said period T1.

The resistors R1, R2, and the transistor Q2 constitute a circuit for terminating the voltage elevation, and, in response to said low-level output signal d from the gate G1, the transistor Q2 is turned on to short circuit the base and emitter thereof, thus terminating the oscillation of the voltage elevating circuit. Consequently the noises eventually generated in the voltage elevating circuit are not introduced into the light emission control circuit 8, and the proper function of said control circuit 8 is thus assured.

A smoothing circuit composed of the diode D2 and the capacitor C2 supplies electric power to the timer circuit 7, light emission control circuit 9, light emission control detecting circuit 9, monostable multivibrator 10, gates G1–G4, astable multivibrator and LED driving circuit which are driven by the primary power source voltage. In case the switch S3 is opened and the switch S5 is closed, or in case the light emission control circuit 8 does not generate the aformentioned stop signal, the light emission control detecting circuit 9 releases the alarm signal by maintaining the line c at the high-level state for a determined period T2, said alarm signal being supplied to an input terminal of the NOR gate G2. Other two input terminals of the NOR gate G2 are at the low-level in this state, so that the gate G2 releases a low-level output signal for the period T2, thus turning off the transistor Q5. Also during said period T2 the astable multivibrator starts oscillation to supply an output signal g to one of two other input terminals of the OR gate G4. The low-level output signal of the gate G2 is also supplied to an input terminal of the AND gate G3, whereby said gate G3 releases a low-level output signal during the period T1, irrespective of the state of the other input signal f. The output signal of the gate G3 is supplied to the other input terminal of the gate G4. Thus, when the astable multivibrator is in oscillation, the output signal g thereof is supplied through the gate G4 and the transistor Q6 is repeatedly turned on and off, whereby the light-emitting element LED is intermittently activated to indicate that the light emission control has not been effected. More specifically, the light-emitting element LED is lighted or extinguished respectively when the output signal g of the astable multivibrator is either at the high-level or low-level state. Said output signal g is also supplied to the monostable multivibrator 10, which is triggered at the leading end of the output signal g and thereafter releases a high-level output signal to the signal line e for a determined period T3. The output signal of the monostable multivibrator is supplied to an input terminal of the NOR gate G1, so that the output signal g is shifted to the high-level state. Consequently, in synchronization with the activation of the light-emitting element LED, the gate G1 releases a low-level signal during the determined period T3 to turn on the transistor Q2, whereby the voltage elevating circuit is deactivated to reduce the load to the power source. Thus, in case the light-emitting element LED is blinking, the voltage elevating circuit is deactivated during the lighting of said element LED to secure the voltage required for activating said element LED, and the voltage elevating circuit is activated for charging the main capacitor C1 only when the light-emitting element LED is extinguished.

When the main capacitor C1 is charged again to a determined voltage by the voltage elevating circuit after the light emission from the flash tube FT, the charged voltage detecting circuit 6 detects said voltage and supplies a high-level charge completion signal f to an input terminal of the AND gate G3, of which the other input terminal is connected to the output terminal of the NOR gate G2. In a state where the switches S3 and S5 are respectively open and closed and the output signal c is in the low-level state indicating the absence of the light-emission control alarm signal, the gate G2 releases a high-level signal whereby the gate G3 transmits the input signal f. When the charged voltage detecting circuit 6 releases a high-level signal f in this state, the gate G3 supplies a high-level signal to the gate G4 which also receives a low-level signal g in this state. Thus the gate G4 releases a high-level signal to activate the light-emitting element LED, thus indicating the completion of the capacitor charging. However, in case the NOR gate G2 releases a low-level output signal h, the AND gate G3 releases a low-level output signal regardless of the state of the input signal f, whereby the indication for the completion of charging is extinguished and the alarm signal is preferentially indicated.

Now there will be explained a case in which the camera is provided therein with the light emission control circuit 11 for the TTL light emission control. When the TTL control mode is selected by the operator, the switch S4 is connected to the line i while the switch S5 is opened. In case the camera on which the flash apparatus is mounted is capable of the TTL light emission control, a high-level signal j is generated to provide a base current in the transistor Q7 through the resistor R15 to turn on said transistor, whereby the collector thereof is at the low-level state, which is connected to an input terminal of the gate G2. In a state where the signal c is at the low-level stage and the switch S3 is open, the gate G2 releases a high-level signal whereby the light-emitting element LED does not give an alarm but indicates the charged state of the main capacitor. Said element is extinguished in the uncharged state and is continuously lighted when the charging is completed.

In response to the closing of the flash contact switch S2 of the camera, the flash tube FT starts the light emission as explained in the foregoing, and the photodetector DP2 in the camera receives the reflected light through the photographing lens. The circuit 11 integrates the reflected light, and, when the integration reaches a determined value, releases a light emission stop signal to the line i to terminate the light emission. Said signal is simultaneously transmitted to the light emission control detecting circuit 9. In case said stop signal is not generated due to the insufficient reflected light, the light-emitting element LED gives a blinking alarm for the determined period T2 as explained above, and the voltage elevating circuit is intermittently activated. Also in case the operator selects the TTL light emission control mode by the switches S4, S5 despite the fact that the camera is not provided with the TTL control function, the camera identification signal on the line j assumes the low-level state to turn off the transistor Q7, whereby the collector thereof assumes the high-level state to release a low-level output signal h from the gate G2. Consequently the light-emitting element LED provides a blinking alarm and the voltage elevating circuit is intermittently activated.

As explained in the foregoing, the switch S3 is closed for displaying an alarm signal other than the alarm signal for the light emission control. In response to the closing of switch S3, the gate G2 receives a high-level signal and releases a low-level signal h, whereby the astable mutivibrator starts oscillation to cause blinking of the light-emitting element LED and intermittent oscillation of the voltage elevating circuit.

Figure 2:
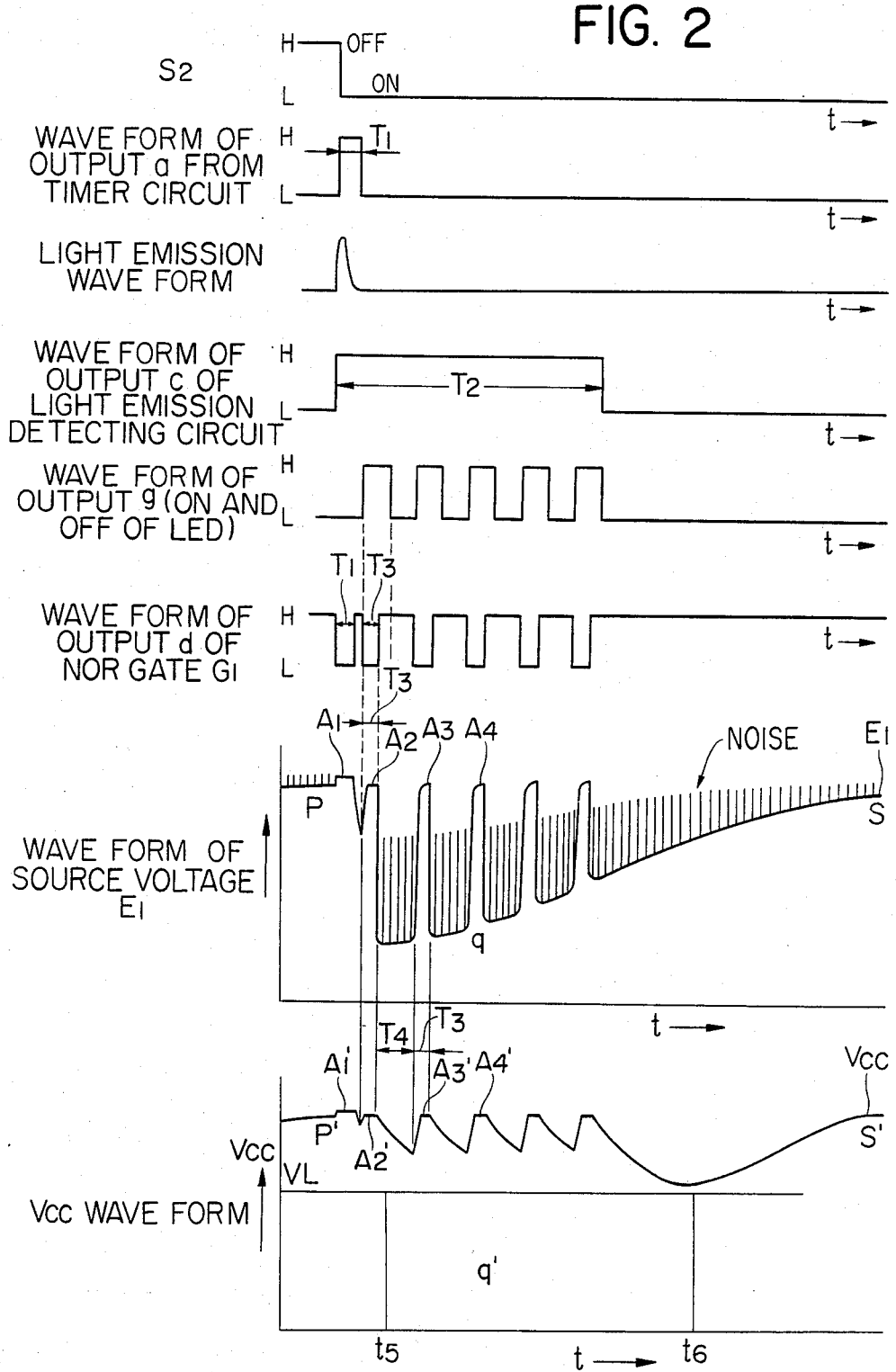
FIG. 2 is a waveform chart showing various signals in the circuit shown in FIG. 1.

FIG. 2 is a timing chart showing the function of the electronic flash apparatus of the present invention. In response to the closing of the switch S2, the apparatus starts light emission and the timer circuit 7 generates an illustrated pulse output signal a of a duration T1. Within said duration T1, the flash tube FT emits flash light as represented by a curve, and the light emission control circuit 8 performs the control operation and terminates the light emission. The present timing chart illustrates a case in which the flash tube FT gives a full light emission because of an insufficient reflected light from the object, and a high-level light emission control alarm signal c is generated for a duration T2 by the detecting circuit 9.

The source voltage E1 is restored during said period T1 since the transistor Q2 is turned on at A1 to turn off the voltage elevating circuit, and the noises from said circuit are also avoided. During the period T2 the output signal g oscillates to cause blinking of the light-emitting element LED. The monostable multivibrator 10 is triggered at the start of the output signal g, whereby the output signal d of the NOR gate G1 is shifted to the low-level state for the period T3, thus inactivating the voltage elevating circuit. In this manner the source voltage E1 is restored as represented by A2, A3, A4, . . . . The voltage Vcc from the smoothing circuit is restored in a similar manner as indicated by A1′, A2′, A3′, A4′, . . . , so that the light-emitting element LED is assumed of an enough voltage for giving the alarm signal.

The time constant T3 of the monostable multivibrator 10 need not necessarily be equal to the lighting time of the light-emitting element LED but may be determined in such a manner that the voltage Vcc is not reduced below a minimum operating voltage $V_L$ for the light-emitting element driving circuit or for other circuit in the presence of an alarm signal, as said voltage Vcc is restored by the inactivation of the voltage elevating circuit and is again reduced by the current consumption in the load when the current supply by the smoothing circuit is interrupted when the voltage elevating circuit is again activated. Accordingly, in this embodiment, the time constant $T_3$ is set to be shorter than the period of high level of the output g, as shown in FIG. 2. Also in case the voltage elevating circuit is intermittently activated only for a determined period immediately after the light emission as in the case of the light emission control alarm signal, the prolongation of the charging time of the main capacitor C1 caused by the intermittent function of the voltage elevating circuit is in fact negligibly small. In such case the alarm signal for the closing of the switch S3 or for a low-level camera identification signal j can always be displayed independently from the light emission, and the charging time of the main capacitor C1 is made inevitably longer by the intermittent function of said voltage elevating circuit, in comparison with a continuous capacitor charging, but such defect can be alleviated if the monostable multivibrator 10 is modified as a circuit shown in FIG. 3.

Figure 3:
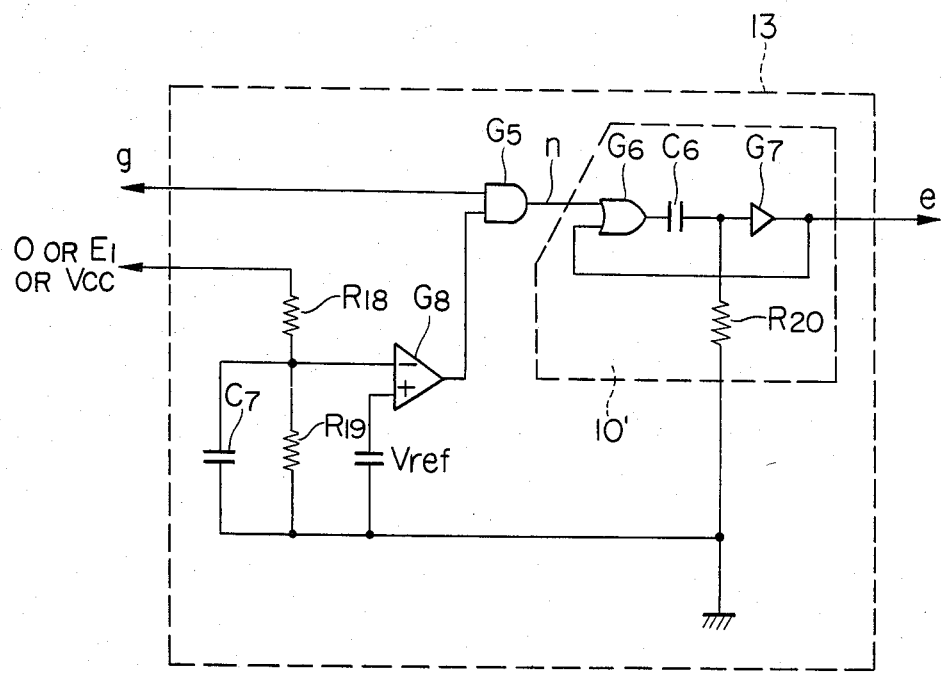
FIG. 3 is a circuit diagram showing another embodiment of the present invention.

In FIG. 3, signals o, g and e are same as those shown in FIG. 1. A monostable multivibrator 10′ is composed of an OR gate G6, a buffer G7, a capacitor C6 and a resistor R20 and is triggered by the low-to-high shift of an input signal n of the gate G6, thereby releasing a high-level signal c for a period T3 to be determined by the capacitor C6 and the resistor R20. A gate G5 is connected at an input terminal thereof to the output line g of the astable multivibrator and at the other input terminal to the output terminal of a voltage comparator G8. A charged voltage detecting circuit is composed of a capacitor C7, resistors R18, R19, a reference voltage source Vref and the comparator G8, of which non-inverted input terminal is connected to the reference voltage source Vref while the inverted input terminal receives a voltage obtained by voltage division with the resistors R18, R19 from the voltage O, E1 or Vcc in FIG. 1 corresponding to the voltage in the main capacitor C1. When the voltage across the main capacitor C1 is reduced immediately after the light emission, the inverted input voltage of the comparator G8 becomes lower than the reference voltage Vref, so that said comparator G8 releases a high-level signal to open the gate G5. Consequently the input signal g is transmitted through said gate G5, and the voltage elevating circuit is intermittently activated due to the function of the monostable multivibrator 10'. When the voltage obtained by the voltage division with the resistors R18, R19 becomes higher than the reference voltage Vref in the course of charging of the main capacitor C1, the gate G8 provides a low-level signal to close the gate G5, whereby the low-level output signal thereof causes continuous operation of the voltage elevating circuit. In this manner the input signal O is used for detecting the load of the power source, and the reference voltage Vref of said input signal is so selected that the source voltage is satisfactorily restored and the light-emitting element LED is sufficiently driven. In this manner the charging time of the main capacitor C1 can be reduced by the combination of the monostable multivibrator 10' and the charged voltage detecting circuit for the main capacitor C1.

The input signal O for detecting the load of the power source can be directly monitored by the source voltage E1. The capacitor C7 is provided for absorbing ripples. If the source voltage E1 is restored to a level that the capacitor C7 can be charged to the reference voltage Vref, the voltage Vcc is not lowered beyond the minimum value $V_L$ even when the voltage elevating circuit is activated. Consequently when the capacitor reaches the reference voltage Vref, the main capacitor C1 is charged not intermittently but continuously to shorten the charging time of said main capacitor C1.

Although the foregoing explanation has been limited to a structure in which the electronic flash apparatus is separate from the camera and is mechanically and electrically connected thereto, the present invention is naturally not limited to such case. As an example the electronic flash apparatus may be incorporated in the camera body.

As detailedly explained in the foregoing, the present invention permits, by alternate power supply to the voltage elevating circuit and to other circuit, stable function of various circuits other than said voltage elevating circuit, without prolonging the recycle time from the light emission to the complete charging of the main capacitor.

We claim:

1. An electronic flash apparatus for use in combination with a camera for giving a light emission to an object for obtaining an appropriate exposure, comprising:
    (a) flash means;
    (b) capacitor means for accumulating electric charge for causing light emission from said flash means;
    (c) charging means for charging said capacitor means to bring the voltage thereof to a level required for causing light emission from said flash means;
    (d) light emission control means for controlling the quantity of light from said flash means;
    (e) a light emission control detecting circuit for detecting that said control by said light emission control means is not effected within a determined period and releasing a detection signal;
    (f) means for indicating, in response to said detection signal, that said control by said light emission control means has not been effected, said indicating means including means for generating an oscillation signal in response to said detection signal and means for emitting light in synchronization with said oscillation signal;
    (g) power supply means for supplying power to said charging means, said light emission control means and said detecting means; and
    (h) means for controlling said power supply means so that said power supply means may repeatedly stop power supply to said charging means in synchronization with oscillation of said oscillation signal.

2. An electronic flash apparatus according to claim 1, further comprising means for detecting that the voltage of said capacitor means has exceeded a predetermined value and generating a voltage detecting signal, and means for inhibiting in response to said voltage detection signal, said control means from stopping power supply to said charging means.

3. An electronic flash apparatus according to claim 1 wherein said apparatus is mountable on said camera, wherein said apparatus comprises mounting detecting means for detecting the mounting state on said camera and releasing a mounting detection signal in case said mounting is incomplete, and wherein said indicator means is adapted to display the lack of connection in response to said mounting detecting signal.

4. An electronic flash apparatus for use in combination with a camera for giving a light emission to an object for obtaining an appropriate exposure, comprising:
    (a) flash means;
    (b) capacitor means for accumulating electric charge for causing light emission from said flash means;
    (c) charging means for charging said capacitor means to bring the voltage thereof to a level required for causing light emission from said flash means;
    (d) light emission control means for controlling the quantity of light from said flash means;
    (e) light emission control detecting circuit for detecting that said control by said light emission control means is not effected within a determined period and releasing a detection signal;
    (f) indicator means for indicating, in response to said detection signal, that said control by said light emission control means has not been effected, said indicating means including means for generating an oscillation signal which oscillates with a predetermined frequency between two different levels, and means for emitting light in synchronization with oscillation of said oscillation signal;
    (g) power supply means for supplying power to said charging means, said light emission control means and said detecting means; and
    (h) means for stopping power supply from said power supply means to said charging means in response to change of said oscillation signal from one of said two different levels to the other.

* * * * *